United States Patent
Ramprasad et al.

(10) Patent No.: US 9,264,937 B2
(45) Date of Patent: *Feb. 16, 2016

(54) MOBILE DEVICE MESSAGE SCHEDULER FOR REDUCING CONGESTION

(71) Applicant: TracFone Wireless, Inc., Miami, FL (US)

(72) Inventors: Satish Ramprasad, Miramar, FL (US); Sergio Rivera, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/612,843

(22) Filed: Feb. 3, 2015

(65) Prior Publication Data

US 2015/0148087 A1 May 28, 2015

Related U.S. Application Data

(63) Continuation of application No. 13/471,966, filed on May 15, 2012, now Pat. No. 8,948,796.

(51) Int. Cl.
*H04W 28/02* (2009.01)
*H04W 72/12* (2009.01)
*H04W 4/12* (2009.01)
*H04L 1/16* (2006.01)

(52) U.S. Cl.
CPC ............ *H04W 28/0289* (2013.01); *H04W 4/12* (2013.01); *H04W 72/1242* (2013.01); *H04L 1/1607* (2013.01)

(58) Field of Classification Search
CPC ... H04L 1/1607; H04L 12/1895; H04L 67/34; H04W 72/1242; H04W 72/124; H04W 28/02892; H04W 4/12; H04W 28/0289; H04W 4/20; H04W 28/02; H04W 24/04; H04W 24/10; H04W 24/00; H04W 24/02; H04W 74/00; H04W 74/002; H04W 74/004; H04W 74/04; H04W 76/02
USPC ......................................... 455/466; 370/335
See application file for complete search history.

(56) References Cited

U.S. PATENT DOCUMENTS

| | | | |
|---|---|---|---|
| 2005/0163069 A1 | 7/2005 | Xu et al. | |
| 2010/0099443 A1 | 4/2010 | King et al. | |
| 2010/0323667 A1* | 12/2010 | Oschwald | G06Q 10/107 455/412.2 |
| 2011/0069681 A1 | 3/2011 | Kang et al. | |
| 2012/0023065 A1* | 1/2012 | DeWeese | G06F 17/30174 707/613 |

* cited by examiner

*Primary Examiner* — Meless Zewdu
(74) *Attorney, Agent, or Firm* — Baker & Hostetler LLP

(57) ABSTRACT

A method, device and system are provided for scheduling the delivery of messages from a wireless device in order to reduce congestion on the wireless network used by the wireless device. A message scheduler application operating on the wireless device intercepts messages being sent from at least one application running on the wireless device to a device layer for transmission, where intercepted messages are collected and held in a message queue for later transmission. The message scheduler monitors operation of the wireless device to detect the establishment of a communication connection, such as a voice call or packet data session, and causes the messages in the message queue to be transmitted from the wireless device utilizing logical channels assigned to the wireless device when setting up the communication connection that are different from the traffic channel assigned for the communication connection to transmit voice or data content.

10 Claims, 6 Drawing Sheets

MOBILE DEVICE MESSAGE SCHEDULER FOR REDUCING CONGESTION

CROSS REFERENCE TO PRIOR APPLICATIONS

This application is a continuation of the U.S. patent application Ser. No. 13/471,966, filed May 15, 2012 now U.S. Pat. No. 8,948,796 issued Feb. 3, 2015, which is incorporated herein by reference in its entirety.

COPYRIGHT NOTICE

A portion of the disclosure of this patent document contains materials that are subject to copyright protection. The copyright owner has no objection to the facsimile reproduction by anyone of the patent document or the patent disclosure, as it appears in the Patent and Trademark Office file or records, but otherwise reserves all copyright rights whatsoever.

TECHNICAL FIELD

The present invention relates generally to the transmission of messages from a mobile device and, more particularly, to a message scheduler operating on a mobile device that controls when messages are to be transmitted from a mobile device in order to reduce network congestion.

BACKGROUND

It is often necessary for mobile devices, such as cellular phones that make use of a Global System for Mobile Communications (GSM) cellular network, to send periodic status messages from the mobile devices to an application server residing on the network side. The transport mechanism used for these types of messages when conversing with an application gateway is often SMS or USSD. The messages being sent by the mobile device can be varying sizes and convey status of the mobile device or use of previous operations. When a large number of mobile devices are located within a certain geographical region, congestion of the wireless network can result from a large number of mobile devices simultaneously attempting to utilize network resources to transmit status messages.

There have been various studies that calculate the theoretical maximum number of messages (e.g., SMS messages) that are sustainable across a large geographical region, such as Metropolitan New York or Washington D.C. or the like. However, the estimations used in these studies are based on cellular subscribers being randomly dispersed across the entire region, and not having large concentration of subscribers and mobile devices within a particular cell site, all wanting to send status messages back to an application server at substantially the same time. This concentrated use case can result where there is a large customer base residing in a certain area (e.g., university housing) or when there are suddenly a larger than normal number of mobile devices in a concentrated area (e.g., Times Square in New York City on New Year's Eve). In such cases, the cell tower, or a collection of towers around the subscriber base, could be overwhelmed by the sheer number of status messages being sent out by the subscribers' mobile devices, thereby resulting in outages introduced to messaging services (e.g., SMS or USSD) from such contention and/or also having the performance of voice services severely degraded.

For example, should SMS be the transport deployed for GSM communications, the mobile devices would attempt to send one or more Mobile Originated (MO) SMS message(s) to the back-end application gateway. The MO SMS message could be resident in the device or be part of a programmable application that is loaded onto the device. For devices to programmatically initiate sending a message, the message would need to be spread out in time between one device and another. It is also not typically known when a collection of devices would reside in the same geographic area, thereby causing contention, or even bringing down cellular services in the serving cell, should they not have a random way of sending such messages. It is also difficult to ascertain the location of mobile subscribers' proximity to each other while scheduling such messages from within the clients. While one may be inclined to state that mobile subscribers camped on a certain cell are scheduled to a different hour, the mobile subscriber(s) could move to cells with lower capacity, and such messages could overwhelm the particular cell site.

The contention as stated above could result in a variety of unpleasant behavior, from SMS messages being dropped, no in-bound/out-bound calls permitted from within that cell, or trigger national security alerts from carrier's networks that find it as a denial of service attack originating from a group of mobile subscribers.

The following description provides a brief background of GSM telephony, that includes some description of the various signaling mechanisms used for various call and data related activity. The GSM standard consists of logical channels that are mapped to a single physical channel. The definitions of the various logical channels for the GSM standard are set forth as follows. The logical channels include traffic channels and control channels. Traffic Channels (TCH) are used to carry encoded speech or user data in a circuit switched mode, and TCH can be either half rate or full rate depending on the type of encoding used for speech data. Control channels are used to carry signaling or synchronization data. The following control channels exist for voice and data:

BCCH: Broadcast Control Channel. This channel is a one-to-many unidirectional control channel used to broadcast Base Station specific information for Mobile Subscribers for calibration purposes/informative purposes.

CCCH: Common Control Channel. This is a point to multipoint bi-directional control channel used for access management. The CCCH further comprises the following channels: (i) Downlink Paging Channel (PCH) to page the Mobile Subscriber; (ii) Random Access Channel (RACH) to request assignment of a DCCH; and (iii) Access Grant Channel (AGCH) used to assign a Mobile Subscriber a specific DCCH.

DCCH: Dedicated Control Channel. The DCCH is a point to point directional control channel. The DCCH further comprises the following channels: (i) Stand Alone Dedicated Control Channel (SDCCH) used for setting up a voice call, prior to the Mobile subscriber being assigned a TCH (traffic channel), and also used for sending Mobile Originated SMS messages, routing area updates, and other requests initiated by the Mobile Subscriber to the base station; and (ii) an Associated Control Channel (ACCH).

In order for a mobile subscriber to initiate a voice call using GSM, or SMS message outside of a voice call, the mobile subscriber makes the authentication, ciphering, and establishment requests over the SDCCH. The SDCCH is acquired by the MS sending a paging request over the RACH. The Base Station Controller (BSC) allots a SDCCH over the Access Grant Channel (AGCH). The Mobile Subscriber uses the allotted SDCCH for all further setup and transfer.

The following call flow occurs for all messages between the handset and the Base Station Controller (BSC) during a Mobile Originated SMS message outside of a voice call based upon the GSM specification, as illustrated in FIG. 1, which is taken from Figure F1/GSM-04.11 of the GSM Standard. The Mobile Subscriber (MS) makes a channel request over the RACH. The BSC assigns a SDCCH to the MS over the AGCH. The MS then performs authentication and selects a cipher mode. The MS then initiates SAPI 3 establishment by a SABM command on the SDCCH. The SAPI 3 link stays active until the last CP ACK is received by the Mobile Switching Center (MSC). The MSC then sends a Clear Command to the BSC, which in turn issues a channel release to the MS. The MS goes on to release the SDCCH channel that was allocated for the short message transfer.

The voice call establishment procedure in GSM follows a very similar route till the cipher mode is selected. At that point onwards, the MS is assigned a TCH (Traffic Channel), a FACH (Fast Associated Control channel), and a SACCH (Slow Associated Control Channel). The MS then releases the SDCCH. It is evident from above that in order to sufficiently have peak network performance the GSM subsystem must carefully arbitrate the number of SDCCH requests being made at any given second. Should a number of mobile subscribers attempt to simultaneously send SMS messages, outside of a call, or attempt to make calls the number of SDCCH channels available will be depleted. In addition, the number of SDCCH channels available is limited by the TRX configuration within a cell site, and is governed by how they are configured by service providers.

In order to obtain a SDCCH, the cell phone must ask a cell for a channel assignment. This is done by sending an access burst on the RACH. However, if a large number of users attempt to simultaneously perform this request, the performance degrades significantly.

While there are operator or server originated throttling mechanisms that exist to throttle down mobile terminated messages that arrive at mobile terminals, there are no throttling down mechanisms at the network or the handset that prevent the reverse problem of throttling down mobile device originated messages that can result in message congestion and degradation of the performance of the wireless network.

Furthermore, the process of initiating a message transfer at an application server as an operator/server originated throttling mechanism has its drawbacks as the application server is not aware when the mobile terminal is powered on or registered to the network. Should the mobile terminal be switched off or otherwise not registered to the network, the initiated message could expire and become discarded, causing further expenses and resources to resend such messages. Additionally, this process involves at least 2 messages for each transaction, as the application server initiates the request, and the mobile terminal responds to the request. Still further, in a GSM system, the act of sending an messages outside of a voice call actually takes away the ability to initiate a voice call for a different user at the same instant of time, thereby reducing the capacity that a network can support.

SUMMARY

In one or more embodiments, a method, device and system are provided for scheduling the delivery of messages from a wireless device in order to reduce congestion on the wireless network used by the wireless device. A message scheduler application operating on the wireless device intercepts messages being sent from at least one application running on the wireless device to a device layer for transmission, where intercepted messages are collected and held in a message queue for later transmission. The message scheduler application monitors operation of the wireless device to detect the establishment of a communication connection, such as a voice call or packet data session. Upon detecting the existence of a connection, the message scheduler application causes the messages in the message queue to be transmitted from the wireless device utilizing logical channels assigned to the wireless device when setting up the communication connection, where such logical channels are different from the traffic channel assigned for the communication connection to transmit voice or data content. In one or more embodiments, the message scheduler application then send an acknowledgment message back to the corresponding application running on the wireless device indicating that its messages have been transmitted.

In one or more embodiments, the communication connection comprises a voice call connection in GSM and the logical control channel comprises at least one of a Fast Associated Control Channel or a Slow Associated Control Channel. In one or more embodiments, the communication connection comprises a packet data session connection in GSM and the logical control channel comprises a Packet Data Traffic Channel (PDTCH). In one or more embodiments, the messages that are queued by the message scheduler application are Short Message Service (SMS) messages.

In one or more embodiments, the message scheduler application operating on the wireless device prevents the transmission of messages from the wireless device at times when a communication connection is not independently established by the wireless device. In this manner, efficient use of the wireless network bandwidth is achieved by utilizing bandwidth already assigned to an existing communication connection in order to transmit messages from the wireless device, such that the transmission of messages from the wireless device would not degrade the ability of the wireless network to initiate communication connections (e.g., voice calls, data sessions, other types of messaging sessions, etc.).

In one or more embodiments, the message scheduler application operating on the wireless device provides a throttling mechanism to reduce network congestion by causing mobile device originated messages to possess a pattern that is similar to that of voice call origination and termination, which possesses a Poisson distribution instead of a linear/simultaneous arrival rate. In one or more embodiments, operating a message scheduler application in this manner further provides the added benefit of reducing power consumption on wireless devices susceptible to current draw during network access.

DRAWINGS

The above-mentioned features of the present disclosure will become more apparent with reference to the following description taken in conjunction with the accompanying drawings wherein like reference numerals denote like elements and in which.

DETAILED DESCRIPTION

In the description that follows, the various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Reference in this specification to "one embodiment", "an embodiment", "other embodiments", "one or more embodiments" or the like means that a particular feature, structure, or characteristic described in connection with the embodiment is included in at least one embodiment of the disclosure. The appearances of, for example, the phrases "in one embodiment" or "in one or more embodiments" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The word "exemplary" is used herein to mean "serving as an example, instance, or illustration." Any implementation described herein as "exemplary" is not necessarily to be construed as preferred or advantageous over other implementations.

As used herein, the term "wireless device" is intended to encompass any mobile technology computing device that connects to a wireless communication network and may or may not utilize a UICC/SIM card, such as mobile phones, cellular phones, smartphones or the like (e.g., Apple iPhone®, Google Android™, BlackBerry®, other type of PDA or smartphone), tablets (e.g., Tablet PC, iPad®, iPod Touch, etc.), wireless dongles, or other mobile computing devices. The term "wireless device" may be interchangeably used and referred to herein as "wireless handset," "handset," "mobile device," "device," or "phone." Further, reference herein to a "wireless network" or "network" is intended to encompass any type of wireless network from which a wireless carrier or mobile virtual network operator (MVNO) provides wireless services to a wireless device, such as but not limited to a cellular data network (e.g., Global System for Mobile Communication (GSM), COMA, UMTS, EVDO, LTE or the like) or a wireless wide area network (e.g., WiFi, WiMax).

Figure 1:
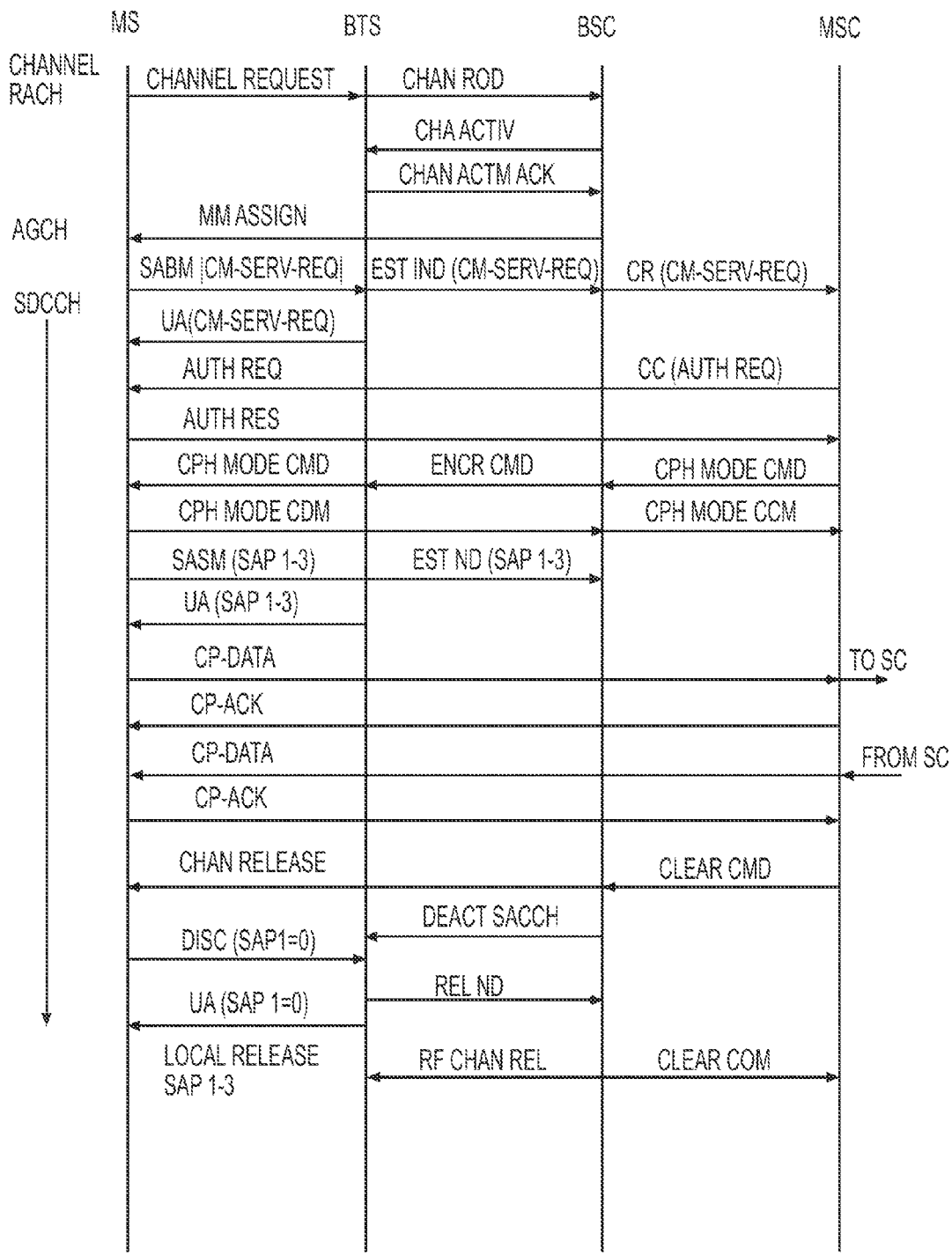
FIG. 1 is sequence diagram illustrating the manner in which messages are handled between a handset and a Base Station Controller (BSC) during a Mobile Originated SMS message outside of a voice call based upon the GSM specification.

Referring now to FIG. 1, a block schematic illustration of the components of a wireless network configuration 10 are illustrated for one or more wireless devices 12 within a wireless coverage or broadcast region 14 in accordance with one or more embodiments. One or more Base Transceiver Stations (BTS) 16 serve the wireless coverage region 14 to provide an access point to the wireless network for the wireless devices 12. The BTS 16 is responsible for carrying out radio communications between the network and the wireless devices 12, including handling speech encoding, encryption, multiplexing, and modulation/demodulation of the radio signals. A Base Station Controller (BSC) 18 in communication with the BTS 16 controls the BTS 16 and substantially handles allocation of radio channels, frequency administration, power and signal measurements from the wireless devices 12. A Mobile Switching Center (MSC) 20 in communication with the BSC 18 handles call and message routing, connection setup, and basic switching functions. The MSC 20 also interfaces with other network components, such as providing to links to backend servers 24 and/or message generators 22. Whenever a wireless device 12 attempts to initiate a communication across the wireless network, such as by initiating a voice call, data packet session or transmit a message (e.g., Short Message Service (SMS) message), certain channels are assigned to the wireless device 12 for the duration of this connection to allow the communication to occur. Within each wireless coverage region 14, a limited number of channels or bandwidth exists that places the limit on the number of wireless devices 12 that can attempt to establish a connection to the wireless network at the same time within the wireless coverage region 14.

Figure 2:
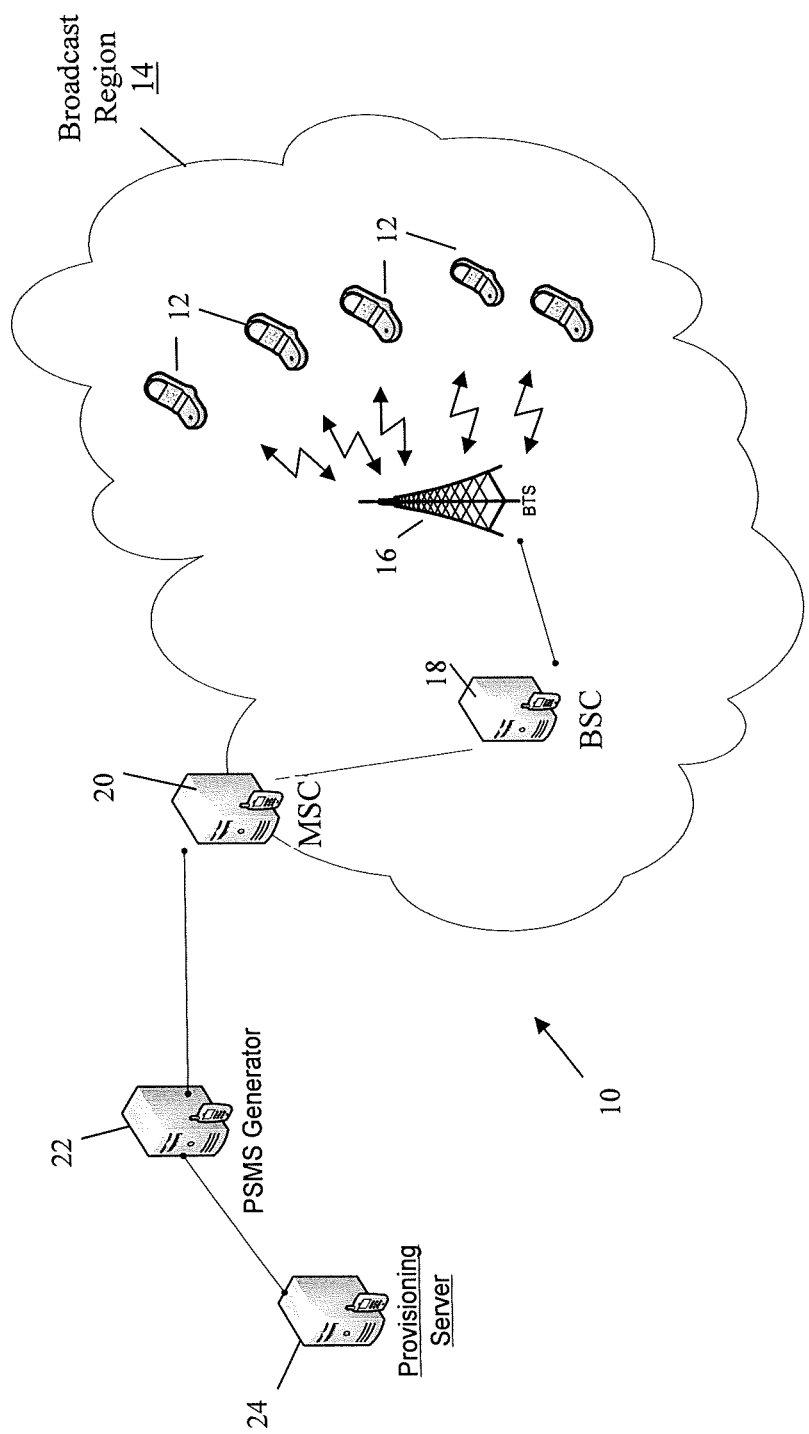
FIG. 2 is a schematic block system diagram of a wireless network model as utilized by one or more embodiments of the present disclosure.

In one or more embodiments, a message scheduler application may be installed on a wireless device 12 for scheduling the delivery of messages from a wireless device in order to reduce congestion on the wireless network used by the wireless device. Referring now to FIG. 2, a schematic block diagram of a wireless device 12 in accordance with one or more embodiments of the present disclosure having a message scheduler application 120 installed thereon is illustrated. In one or more embodiments, the wireless device 12 may include a display 102, an input device 104, a transceiver 106, a processor 108, a memory 110 and a UICC/SIM card 112. In one or more embodiments, SIM card 112 may be removably received within a card slot (not shown) in wireless device 12 and may include its own internal SIM memory 114. Memory 110 may include, for example, random access memory ("RAM") or read only memory ("ROM"), while RAM may be volatile or non-volatile RAM. The message scheduler application 120 and a corresponding message queue 122 may be stored in memory 110. One or more applications 118 or software modules may further be installed on the wireless device 12, such as within memory 110, SIM memory 114, installed in hardware within wireless device 12 or some combination of the same. In one or more embodiments, wireless device 12 includes a secure timestamp 116 that may be obtained from any number of possible sources, including Network Identify and Time Zone (NITZ) where the time is sent to the wireless device 100 from a subscribed PLMN or a synchronization with a remote atomic clock, which are stored in memory 110. In one or more embodiments, the secure timestamp 116 may be obtained from a handset-based secure timestamp circuit or any other manner of maintaining a secure timestamp as known to those skilled in the art. These various components within wireless device 12 are coupled to communicate data with one another, such as through an internal bus 119 or other connectors.

Figure 3:
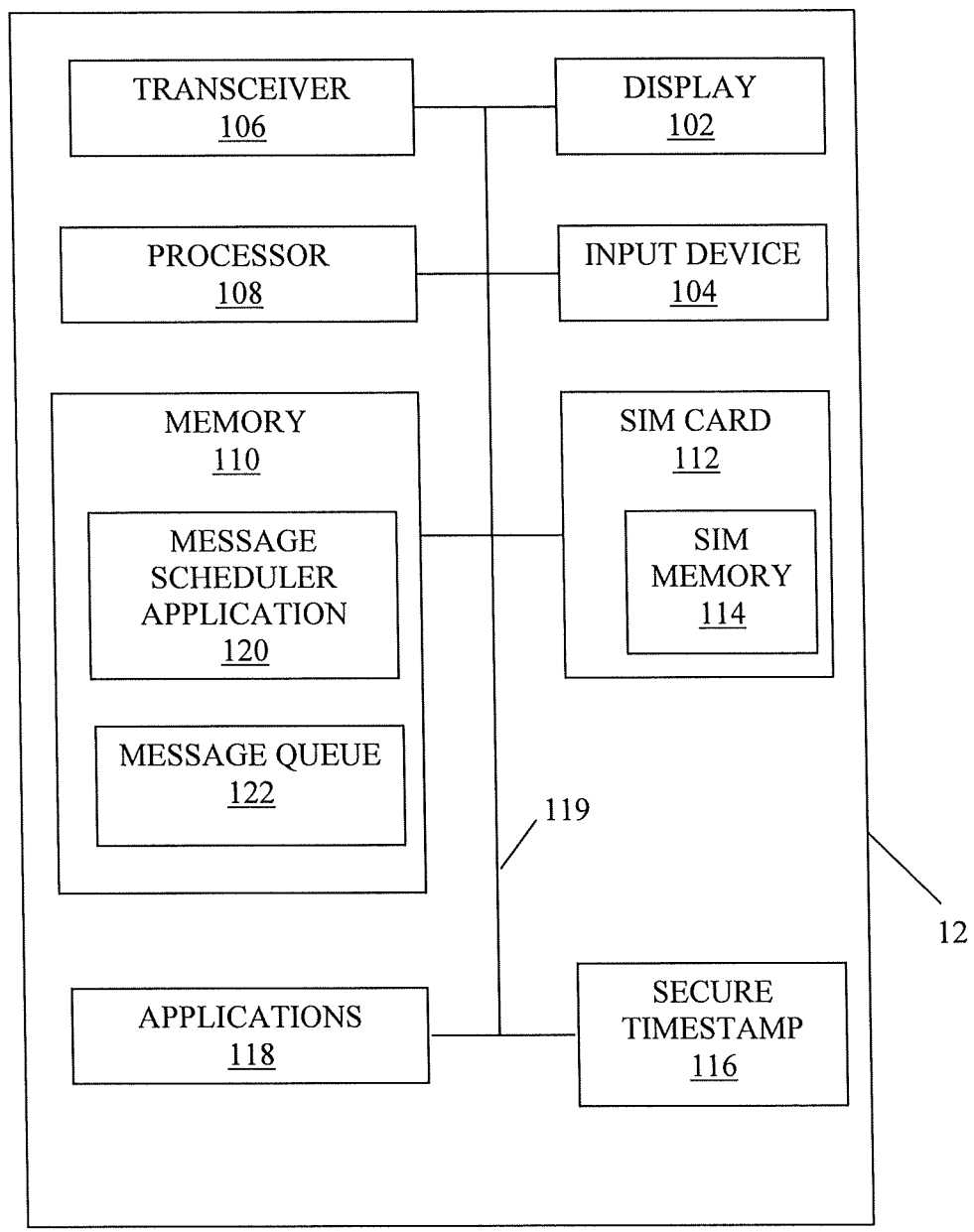
FIG. 3 is a schematic diagram of a wireless device architecture in accordance with one or more embodiments of the present disclosure.

In one exemplary embodiment, wireless device 12 may comprise a mobile phone, as illustrated in FIG. 3, in which display 102 may comprise a screen display and input device 104 may comprise any one or combination of a keypad 124, track ball 126, selectable buttons 128, a touch screen 126 having selectable icons, and/or a microphone (not shown) for receiving voice inputs. The wireless device 12 includes an antenna coupled to transceiver 106 to facilitate the transmission and receipt of data, messages and communications by wireless device 12.

Although for the sake of clarity and simplicity, certain exemplary embodiments of the present invention will be described in terms of the wireless device 12 being a mobile phone, it should be understood that the present invention is not limited to this exemplary embodiment. Alternative embodiments of the present invention may include any mobile communications device that makes use of a wireless network to send and receive messages.

In one or more embodiments, software, processor-executable instructions and software architectures may be described in terms of certain software modules or applications. For the purposes of this disclosure, a module or application is a software, hardware, or firmware (or combinations thereof) system, process or functionality, or component thereof, that performs or facilitates the processes, features, and/or functions described herein (with or without human interaction or augmentation). It should be understood that where a plurality of software modules or applications are described, the functions performed by the plurality of software modules or applications may alternatively be performed by a single software module or application. Similarly, where a single software module or application is described, the functions performed by the single software module or application may alternatively be performed by a plurality of software modules or applications. Wireless device 12 contains embedded software including modules, programs, processor-executable instructions and/or data stored internally in memory 110 (or SIM memory 114

In one or more embodiments, all accounting operations associated with use of wireless device 12 are performed within wireless device 12, which assists in reducing network traffic and congestion and expanding the overall traffic handling capacity of the associated wireless network by minimizes the communication traffic required between the wireless service provider's host processer that handles billing operations and wireless device 100 or other network components.

FIG. 3 further illustrates via block diagrams various operational layers within wireless device 12 in accordance with one or more exemplary embodiments of the present disclosure. The message scheduler application 120 operating on the wireless device 12 is configured to intercept messages being sent from the application layer 140 the device layer 150, such as messages being sent from at least one application 118 running on the wireless device 12 to a device layer 150 for transmission over the wireless network. For example, in one or more embodiments, applications 118 may be configured to report information and/or status updates to a backend server 24 through the use of messages sent over the wireless network either at scheduled times or in response to certain activity. In one or more embodiments, a user of the wireless device 12 may initiate the transmission of messages from the wireless device 12, such as Short Message Service (SMS) messages or other types of messages that can be sent over a data bearer communication channel.

Figure 4:
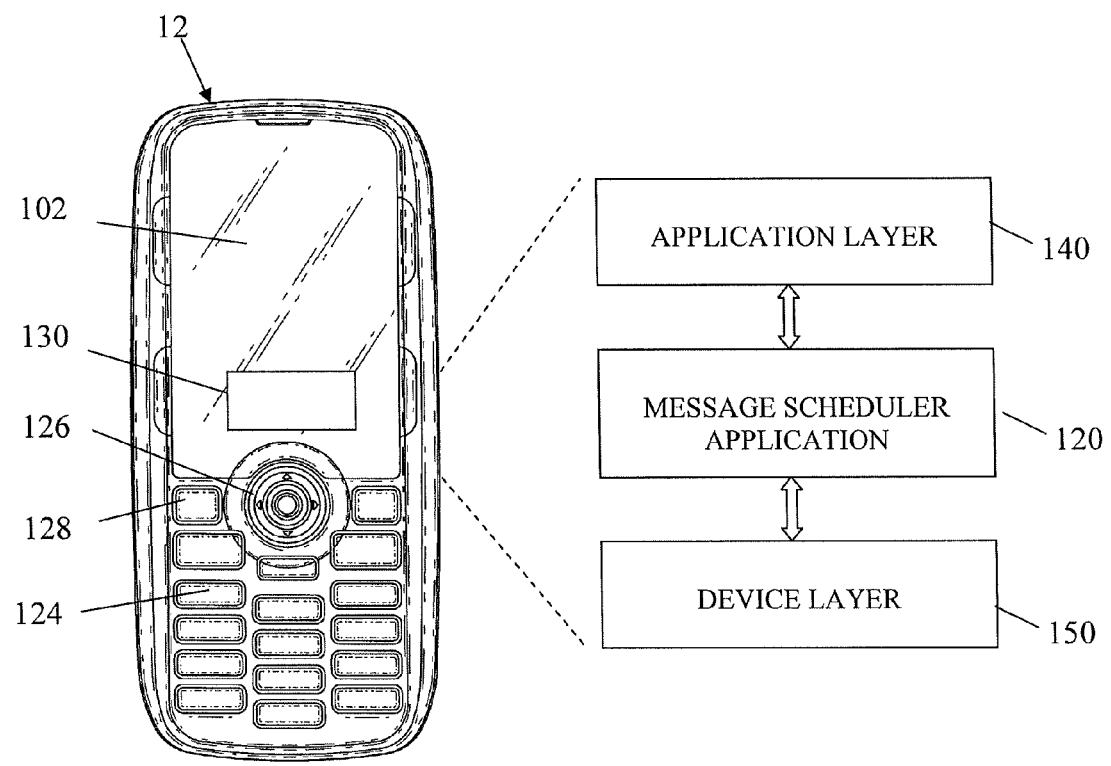
FIG. 4 is a schematic block diagram of a wireless device including certain representative layers in accordance with one or more embodiments of the present disclosure.

Referring now to FIG. 4, an operational flow diagram is provided illustrating various aspects of the procedures implemented by the message scheduler application 120 in accordance with one or more embodiments. Upon initiation of the message scheduler application 120, messages being sent from the application layer 140 (i.e., from applications 118 on the wireless device 12) to the device layer 150 for transmission from the wireless device 12 over the wireless network are detected and intercepted in operation 200. The intercepted messages are collected and stored in the message queue 122 in operation 202, where the stored messages are held for later transmission. The message scheduler application 120 determines in operation 204 when a connection is established by the wireless device 12. For example, the message scheduler application 120 monitors operation of the wireless device 12 to detect the establishment of a communication connection, such as a voice call or packet data session or some other communication connection. Until a communication connection is established by the wireless device 12 independent from the transmission of the messages contained in the message queue 122, the message scheduler application 120 delays the transmission of the messages contained in the message queue 122 in operation 206 until such future point in time when an independent communication connection is established. In one or more embodiments, this delayed transmission of the messages may be overridden in certain situations where immediate transmission of certain messages is required.

Once a communication connection is established by the wireless device, the message scheduler application 120 then makes use of the existing communication connection in order to cause the messages contained in the message queue 122 to be transmitted by the wireless device 12 over the wireless network in operation 208. In one or more embodiments, the messages are transmitted over bandwidth already assigned to the wireless device 12 for the established communication connection such that the transmission of the messages contained in the message queue 122 does not require any additional bandwidth to be assigned to the wireless device 12 to accomplish their transmission. In one or more embodiments, the message scheduler application 120 then sends an acknowledgment message back to the corresponding application 118 running on the wireless device 12 in operation 210 providing a confirmatory indication that its messages have been transmitted by the wireless device 12.

In one or more embodiments, upon detecting the existence of a connection, the message scheduler application 120 causes the messages in the message queue 122 to be transmitted from the wireless device 12 utilizing logical channels assigned to the wireless device 12 when setting up the communication connection, where such logical channels are different from the main traffic channel assigned for the communication connection to transmit voice or data content or other main payload content. In one or more embodiments, the communication connection comprises a voice call connection in a GSM wireless network and the logical control channel comprises at least one of a Fast Associated Control Channel (FACH) or a Slow Associated Control Channel (SACCH). According to the GSM standard, both a FACH and a SACCH are assigned to a wireless device 12 whenever a voice call connection is established. The message scheduler application 120 makes use these already assigned channels as a transport mechanism for transmitting the application messages stored in the message queue 122 over the wireless network, thereby resulting a more efficient use of cellular bandwidth by not requiring additional bandwidth to transmit such messages and further by not requiring specific bandwidth to be reserved in the first place in order to transmit such messages.

In one or more embodiments, the communication connection comprises a packet data session connection in a GSM wireless network and the logical control channel used to transport the application messages stored in the message queue 122 comprises a Packet Data Traffic Channel (PDTCH) that is assigned to the wireless device 12 when setting up the packet data session connection. The use of the already assigned PDTCH similarly results in a more efficient use of cellular bandwidth by not requiring additional bandwidth to transmit such messages and further by not requiring specific bandwidth to be reserved in the first place in order to transmit such messages.

In one or more embodiments, the messages that are queued by the message scheduler application 120 are Short Message Service (SMS) messages. However, it is understood that the messages may comprise any type of message that can be sent from an application 118 on the wireless device 12 to an application server 24 over the additional logical channels that are assigned to a wireless device 12 when setting up independent communication connections.

Figure 5:
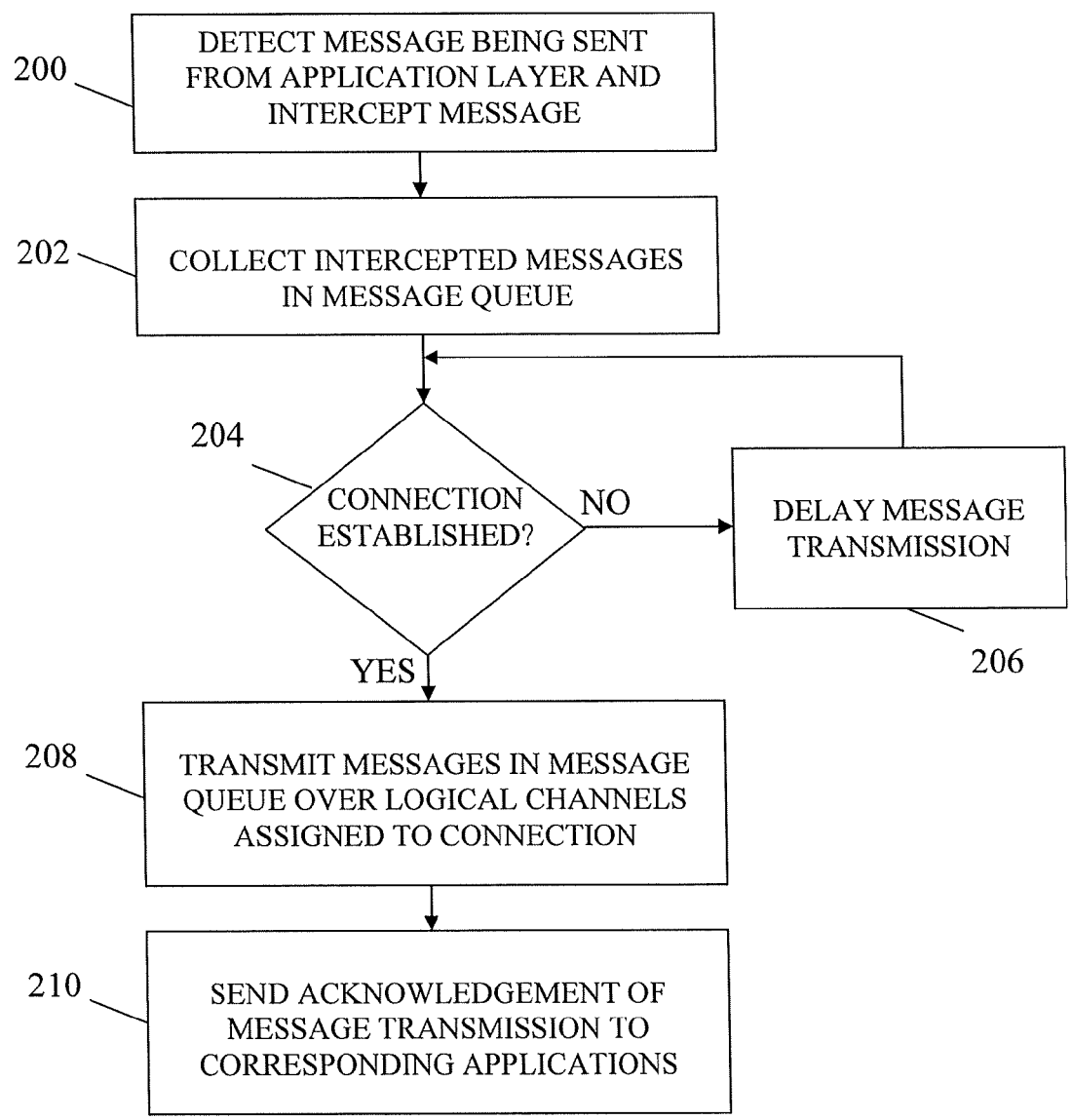
FIG. 5 is an operational flow diagram of a process performed by the message scheduler application in accordance with one or more embodiments of the present disclosure.
Figure 6:
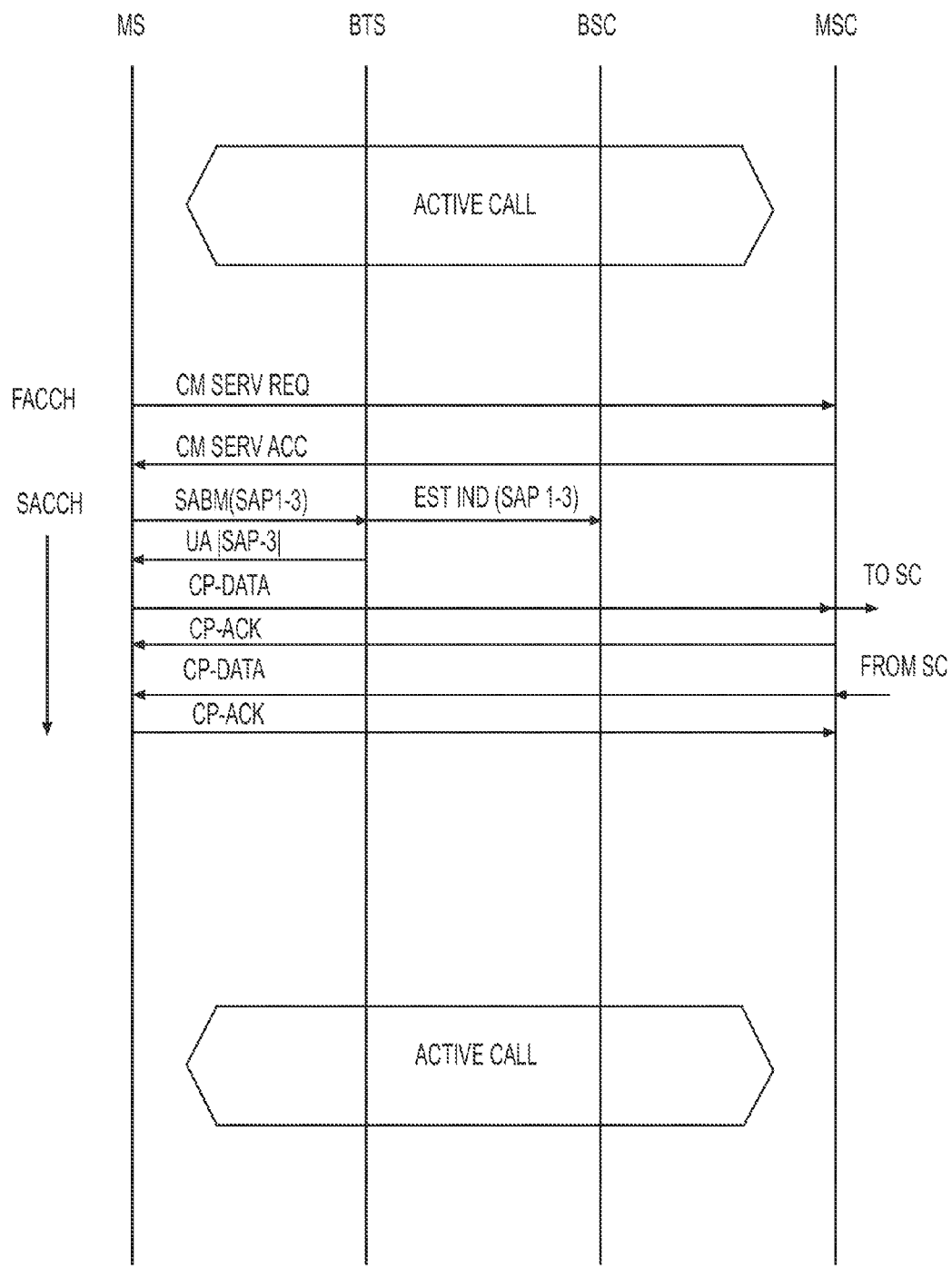
FIG. 6 is a sequence diagram illustrating the manner in which messages are handled between a handset and a BSC during a voice call based on the GSM specification in accordance with one or more embodiments of the present disclosure.

Referring now to FIG. 5, a call flow sequence diagram is illustrated showing operation of the message scheduler application 120 in transmitting messages stored in the message queue 122 in response to the detection of an established communication connection by the wireless device 12 in accordance with one or more embodiments. In the example illustrated in FIG. 5, a SMS message is transmitted over a connected voice call for the wireless device 12 or Mobile Station (MS). When the MS is connected to a voice call, it acquires a TCH, a FACH, and a SACCH. The TCH is the main traffic channel used for sending encoded voice traffic, while the FACH is used for call signaling, location area updates, urgent signaling, and the SACCH is used for sending/receiving short messages, measurement reports etc. These three logical channels are assigned to the handset during the entire duration of the voice call, and will remain resident for the duration of the voice call whether or not the subscriber uses them. As is evident from the call flow illustrated in FIG. 5, there is no need for authentication, selection of the cipher mode, and, the SMS message is now sent over the SACCH assigned for the voice call. This process terminates when the last CP-ACK is received at the MSC 20. Since the voice call continues to be active after transmission of the SMS message is complete, there is no channel release (or need for channel release) either. In this manner, the SMS messages are now automatically throttled by the network, such that the SMS messages are only delivered using logical channels reserved and assigned for another purpose, namely the voice call.

In one or more embodiments, in the situation where a SMS message is sent over a packet data network during a packet data session, the MSC 20 in the example shown in FIG. 5 above is replaced by the SGSN, which is the Serving GPRS Support Node, and the SMS messages are sent over the PDTCH assigned to the MS 12 for the packet data session.

In one or more embodiments, the message scheduler application 122 operating on the wireless device 12 prevents the transmission of application messages from the wireless device 12 to the application server 24 at times when a communication connection is not independently established by the wireless device 12. In this manner, efficient use of the wireless network bandwidth is achieved by utilizing bandwidth already assigned to an existing communication connection in order to transmit messages from the wireless device 12, such that the transmission of messages from the wireless device 12 would not degrade the ability of the wireless network to initiate communication connections (e.g., voice calls, data sessions, other types of messaging sessions, etc.).

In one or more embodiments, the message scheduler application 120 operating on the wireless device 12 provides a throttling mechanism to reduce network congestion by linking the ability to send messages to the network's ability to handle voice calls or data packet sessions. In this manner, should a lot of mobile subscribers be within a geographical cell/tower area, the sending of these messages would be throttled down by the network's ability to handle voice calls. Still further, the message scheduler application 120 causes mobile device originated messages to possess a delivery pattern that is similar to that of voice call origination and termination, which possesses a Poisson distribution instead of a linear/simultaneous arrival rate.

In one or more embodiments, if the messages are to be sent over a packet data session (GPRS, 3G, HSPA, etc.) for a wireless device 12 that does not have an always-on session, the distribution of messages being sent is Poisson, as it models user's behavior. For a always-on session, the act of sending the message is over the PDTCH, which is always allocated to the user in a packet data session.

In one or more embodiments, operating a message scheduler application 120 in this manner also separately provides the added benefit of reducing power consumption on wireless devices 12 susceptible to current draw during network access.

These benefits serve to reduce the possibility of network congestion that could otherwise result from a large number of wireless devices 12 in a coverage region 14 have their applications 118 attempting to send messages across the wireless network at substantially the same time.

In one or more embodiments, certain methods and algorithms described in various embodiments herein may be implemented in software, stored on a computer readable medium or computer readable storage medium, such as a memory 110 of wireless device 12 and/or other components, where the memory (or memories of these components) may store computer readable instructions, e.g., program code, that can be executed by a processor or controller to carry out one or more of the techniques described herein. Wireless device 12 may comprise any device as described herein having a processor 108 capable of executing logic or coded instructions. The internal architecture of wireless device 12 may include one or more processors (or CPUs), which interface with at least one computer bus 119. Also interfacing with the computer bus 119 may be a persistent storage medium/media, network interface, memory, e.g., random access memory (RAM), run-time transient memory, read only memory (ROM), etc., media disk drive interface as an interface for a drive that can read and/or write to media including removable media such as floppy, CD ROM, DVD, etc. media, display interface as interface for a monitor or other display device, at least one input interface (e.g., keyboard interface, mouse or other pointing device interface, etc.), and miscellaneous other interfaces not shown individually, such as parallel and serial port interfaces, a universal serial bus (USB) interface, and the like.

The wireless device 12 memory 110 interfaces with its bus 119 so as to provide information stored in memory to processor during execution of software programs such as an operating system, application programs 118, device drivers, and software modules that comprise program code, processor-executable instructions and/or computer executable process steps, incorporating functionality described herein, e.g., one or more of process flows described herein. For example, the operations and process flows performed by wireless device 12 may be embodied in a provisioning software module stored in a memory of wireless device 12. The processor 108 for the wireless device 12 loads processor-executable process steps from storage, e.g., memory, storage medium/media, removable media drive, and/or other storage device, and can then execute the stored process steps in order to execute the loaded processor-executable process steps. Stored data, e.g., data stored by a storage device, can be accessed by the processor during the execution of processor-executable process steps. Persistent storage medium/media is a computer readable storage medium(s) that can be used to store software and data, e.g., an operating system and one or more application programs, device drivers, and/or program modules and data files used to implement one or more embodiments of the present disclosure.

For the purposes of this disclosure, a computer readable medium stores computer data, which data can include computer program code that is executable by a processor of the wireless device 24 in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more embodiments, the actions and/or events of a method, algorithm or module may reside as one or any combination or set of codes and/or instructions on a computer readable medium or machine readable medium, which may be incorporated into a computer program product.

Those skilled in the art will recognize that the devices, methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which may be accorded the broadest interpretation so as to encompass all such modifications and similar structures. The present disclosure includes any and all embodiments of the following claims.

The invention claimed is:

1. A method for scheduling delivery of messages from a wireless device, the method comprising:

storing at least one message to be transmitted from the wireless device in a message queue within the wireless device;

monitoring operation of the wireless device to determine whether there is a communication connection by the wireless device, wherein the communication connection comprises at least one of a voice call connection or a packet data session;

transmitting the at least one message in the message queue from the wireless device utilizing the communication connection by the wireless device over a logical control channel assigned to the wireless device during setup for the communication connection;

operating a message scheduler application on the wireless device to intercept messages being sent from at least one application running on the wireless device to a device layer for transmission, where said intercepted messages are collected and placed into the message queue; and operating the message scheduler application to send an acknowledgment message back to a corresponding application running on the wireless device indicating that the at least one message has been transmitted, wherein the logical control channel is are different from a traffic channel assigned to the wireless device during setup for the communication connection to transmit voice or data content.

2. The method of claim 1, wherein the communication connection comprises a voice call connection in GSM and the logical control channel comprises at least one of a Fast Associated Control Channel or a Slow Associated Control Channel.

3. The method of claim 1, wherein the communication connection comprises a packet data session connection in GSM and the logical control channel comprises a Packet Data Traffic Channel (PDTCH).

4. The method of claim 1, wherein the message comprises a Short Message Service (SMS) message.

5. The method of claim 1, further comprising preventing the transmission of messages from the wireless device at times when the communication connection is not independently established by the wireless device.

6. A computer program product comprising a non-transitory computer-readable medium having instructions, the instructions being operable to enable a wireless device, when executed by a processor, to perform a method for scheduling a delivery of messages from the wireless device, the method comprising:

storing at least one message to be transmitted from the wireless device in a message queue within the wireless device;

monitoring operation of the wireless device to determine whether there is a communication connection by the wireless device, wherein the communication connection comprises at least one of a voice call connection or a packet data session; and transmitting the at least one message in the message queue from the wireless device over the communication connection established by the wireless device over a logical control channel assigned to the wireless device during setup for the communication connection;

intercepting messages being sent from at least one application running on the wireless device to a device layer for transmission, where said intercepted messages are collected and placed into the message queue; and sending an acknowledgment message back to a corresponding application running on the wireless device indicating that the at least one message has been transmitted, wherein the logical control channel is different from a traffic channel assigned to the wireless device during setup for the communication connection to transmit voice or data content.

7. The computer program product of claim 6 wherein the communication connection comprises a voice call connection in GSM and the logical control channel comprises at least one of a Fast Associated Control Channel or a Slow Associated Control Channel.

8. The computer program product of claim 6 wherein the communication connection comprises a packet data session connection in GSM and the logical control channel comprises a Packet Data Traffic Channel (PDTCH).

9. The computer program product of claim 6, wherein the message comprises a Short Message Service (SMS) message.

10. The computer program product of claim 6, the method further comprising preventing the transmission of messages from the wireless device at times when the communication connection is not independently established by the wireless device.

* * * * *